US012492808B2

(12) United States Patent
Smith et al.

(10) Patent No.: US 12,492,808 B2
(45) Date of Patent: Dec. 9, 2025

(54) VIBRATION RETENTION SYSTEM

(71) Applicant: SIGNIFY HOLDING B.V., Eindhoven (NL)

(72) Inventors: Craig Maurice Smith, Sharpsburg, GA (US); Khurram Zeshan Moghal, Senoia, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 3 days.

(21) Appl. No.: 18/571,693

(22) PCT Filed: Jun. 21, 2022

(86) PCT No.: PCT/EP2022/066786
§ 371 (c)(1),
(2) Date: Dec. 18, 2023

(87) PCT Pub. No.: WO2023/274777
PCT Pub. Date: Jan. 5, 2023

(65) Prior Publication Data

US 2024/0280247 A1 Aug. 22, 2024

Related U.S. Application Data

(60) Provisional application No. 63/223,642, filed on Jul. 20, 2021, provisional application No. 63/215,575, filed on Jun. 28, 2021.

(30) Foreign Application Priority Data

Jul. 29, 2021 (EP) .................................... 21188385

(51) Int. Cl.

| | |
|---|---|
| ***F16M 11/00*** | (2006.01) |
| ***F21S 8/08*** | (2006.01) |
| ***F21V 21/116*** | (2006.01) |

(52) U.S. Cl.
CPC ............ *F21V 21/116* (2013.01); *F21S 8/088* (2013.01)

(58) Field of Classification Search
CPC ......... F21V 21/116; F21S 8/088; F16B 7/182; F16B 35/005; F16B 7/02
See application file for complete search history.

(56) References Cited

U.S. PATENT DOCUMENTS 3,156,418 A * 11/1964 Jablonski .............. F21V 21/116 403/334
3,696,242 A * 10/1972 Patry .......................... F21V 3/04 248/219.2

(Continued)

FOREIGN PATENT DOCUMENTS

KR 100891318 B1 3/2009
KR 100928945 B1 11/2009

(Continued)

*Primary Examiner* — Amy J. Sterling

(57) ABSTRACT

A slipfitter assembly (200), comprising: a slipfitter housing (104) forming a tapered pole cavity (138) configured to receive a light pole tenon (140), wherein the tapered pole cavity (138) is formed around a longitudinal axis (120) of the slipfitter housing (104); a plurality of collars (102) arranged within the slipfitter housing (104), wherein each of the plurality of collars (102) comprises an upper portion (110) with a top edge (112) and a lower portion (114) with a bottom edge (116); a plurality of perpendicular set screws (106), wherein each of the plurality of perpendicular set screws (106) is configured to apply a perpendicular mechanical force (118), relative to a longitudinal axis (120) of the slipfitter housing (104), to a lower portion (114) of one of the plurality of collars (102); and a plurality of angled set screws (108), wherein each of the angled set screws (108) is configured to apply an angled mechanical force (122),
(Continued)

relative to the longitudinal axis (120) of the slipfitter housing (104), to an upper portion (110) of one of the plurality of collars (102).

13 Claims, 4 Drawing Sheets

(56) References Cited

U.S. PATENT DOCUMENTS

| | | | | |
|---|---|---|---|---|
| 3,903,409 | A * | 9/1975 | Richilano | F21S 8/086 362/396 |
| 7,261,445 | B2 * | 8/2007 | McBride | F21V 21/116 362/382 |
| 2011/0063828 | A1 | 3/2011 | Ku et al. | |
| 2017/0030563 | A1 * | 2/2017 | Hunt | F21V 23/002 |
| 2018/0283629 | A1 | 10/2018 | Fisher et al. | |

FOREIGN PATENT DOCUMENTS

| | | | |
|---|---|---|---|
| KR | 20100009203 | A | 1/2010 |
| KR | 101449953 | B1 | 10/2014 |
| WO | 2015172112 | A1 | 11/2015 |

* cited by examiner

VIBRATION RETENTION SYSTEM

CROSS-REFERENCE TO PRIOR APPLICATIONS

This application is the U.S. National Phase application under 35 U.S.C. § 371 of International Application No. PCT/EP2022/066786, filed on Jun. 21, 2022, which claims the benefit of European Patent Application No. 21188385.5 filed on Jul. 29, 2021, U.S. Provisional Application No. 63/223,642, filed on Jul. 20, 2021 and U.S. Provisional Application No. 63/215,575, filed on Jun. 28, 2021. These applications are hereby incorporated by reference herein.

FIELD OF THE DISCLOSURE

The present disclosure is directed generally to a vibration-retention system, particularly for public infrastructure lighting fixtures.

BACKGROUND

Lighting fixtures used in public infrastructure (such as street lights) are increasingly top heavy. The lighting fixtures are typically mounted onto a light pole tenon using a slipfitter. This slipfitter is often secured to the light pole using one or more set screws. These set screws are threaded through the slipfitter and tightened to apply sufficient force to the light pole to prevent the slipfitter from loosening due to vibrations. However, heavier luminaires often lead to more significant vibrational forces, which places additional, highly concentrated stresses on the mechanical connections formed by the set screws and the light poles. These stresses can lead to set screw and/or light pole tenon deformation, causing the lighting fixture to loosen from the pole. Once loose, the heavy lighting fixtures pose a significant threat to nearby persons and property. Accordingly, there is a need in the art for systems providing improved stability of top-heavy luminaires used in public infrastructure.

SUMMARY OF THE DISCLOSURE

The present disclosure is directed generally to a collar assembly used to secure a slipfitter assembly to a light pole tenon. Each collar assembly includes two set screws, a perpendicular set screw and an angled set screw, to drive a collar towards a light pole tenon. Using multiple collar assemblies allows the slipfitter assembly to securely attach to a light pole tenon, even when the slipfitter assembly supports a top-heavy luminaire, and the light pole tenon is inserted into the slipfitter assembly at a low insertion depth.

The collar assembly includes a collar, a perpendicular set screw, and an angled set screw. The collar is arranged within the slipfitter housing. The slipfitter housing forms a pole cavity to receive the light pole tenon. The collar is driven against the light pole tenon by two set screws. A perpendicular set screw is threaded through the slipfitter housing to apply a perpendicular mechanical force to a lower portion of the collar. This perpendicular mechanical force is perpendicular to a longitudinal axis of the slipfitter housing and the pole cavity, and drives the lower portion of the collar towards the light pole tenon in a horizontal manner.

Further, an angled set screw is also threaded through the slipfitter housing to apply an angled mechanical force to an upper portion of the collar. This angled mechanical force is at an angle of less than or equal to 40 degrees relative to the longitudinal axis of the slipfitter housing and the pole cavity.

The angled mechanical force drives the upper portion of the collar towards the light pole tenon at an angle corresponding to the angle of the angled set screw. The angled mechanical force also drives the upper portion of the collar upwards towards the ceiling of the pole cavity.

Generally, in one aspect, a collar assembly is provided. The collar assembly includes a collar. The collar is configured to be arranged within a slipfitter housing. The collar includes an upper portion with a top edge. The collar further includes a lower portion with a bottom edge. According to an example, the bottom edge of the collar is longer than the top edge. According to a further example, both the bottom edge and the top edge are curved. According to a further example, the collar is spring steel.

According to an example, the collar further includes an interior member folded over an exterior member. According to a further example, the collar further includes a gap between the interior member and the exterior member.

The collar assembly further includes a perpendicular set screw. The perpendicular set screw is configured to apply a perpendicular mechanical force to the lower portion of the collar. The perpendicular mechanical force is applied relative to a longitudinal axis of the slipfitter housing.

The collar assembly further includes an angled set screw. The angled set screw is configured to apply an angled mechanical force to the upper portion of the collar. The angled mechanical force is applied relative the longitudinal axis of the slipfitter housing. The angled mechanical force may drive the collar towards an ceiling of the slipfitter housing. According to an example, the angled set screw forms an angle with the longitudinal axis of the slipfitter housing less than or equal to 40 degrees.

According to an example, the upper portion of the collar includes an upper dimple. The upper dimple is configured to receive the angled set screw. According to a further example, the lower portion of the collar includes a lower dimple. The lower dimple is configured to receive the perpendicular set screw.

Generally, in another aspect, a slipfitter assembly is provided. The slipfitter assembly includes a slipfitter housing. The slipfitter housing forms a tapered pole cavity. The tapered pole cavity is configured to receive a light pole tenon. The tapered pole cavity is formed around a longitudinal axis of the slipfitter housing. According to an example, the slipfitter assembly is configured to support a load of approximately 60 pounds. According to a further example, the tapered pole cavity is configured to receive a light pole tenon with a diameter of approximately 3 inches. According to an even further example, the tapered pole cavity has an insertion depth of approximately 4 inches.

The slipfitter assembly includes a plurality of collars. The plurality of collars are arranged within the slipfitter housing. Each of the plurality of collars includes an upper portion with a top edge and a lower portion with a bottom edge. According to an example, the top edge and bottom edge of each of the plurality of collars are concentric with the tapered pole cavity of the slipfitter housing.

The slipfitter assembly further includes a plurality of perpendicular set screws. Each of the plurality of perpendicular set screws is configured to apply a perpendicular mechanical force to a lower portion of one of the plurality of collars. The perpendicular mechanical force is applied relative to a longitudinal axis of the slipfitter housing.

The slipfitter assembly further includes a plurality of angled set screws. Each of the angled set screws is configured to apply an angled mechanical force to an upper portion of one of the plurality of collars. The angled mechanical force is applied relative to the longitudinal axis of the slipfitter housing.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

Figure 1B:
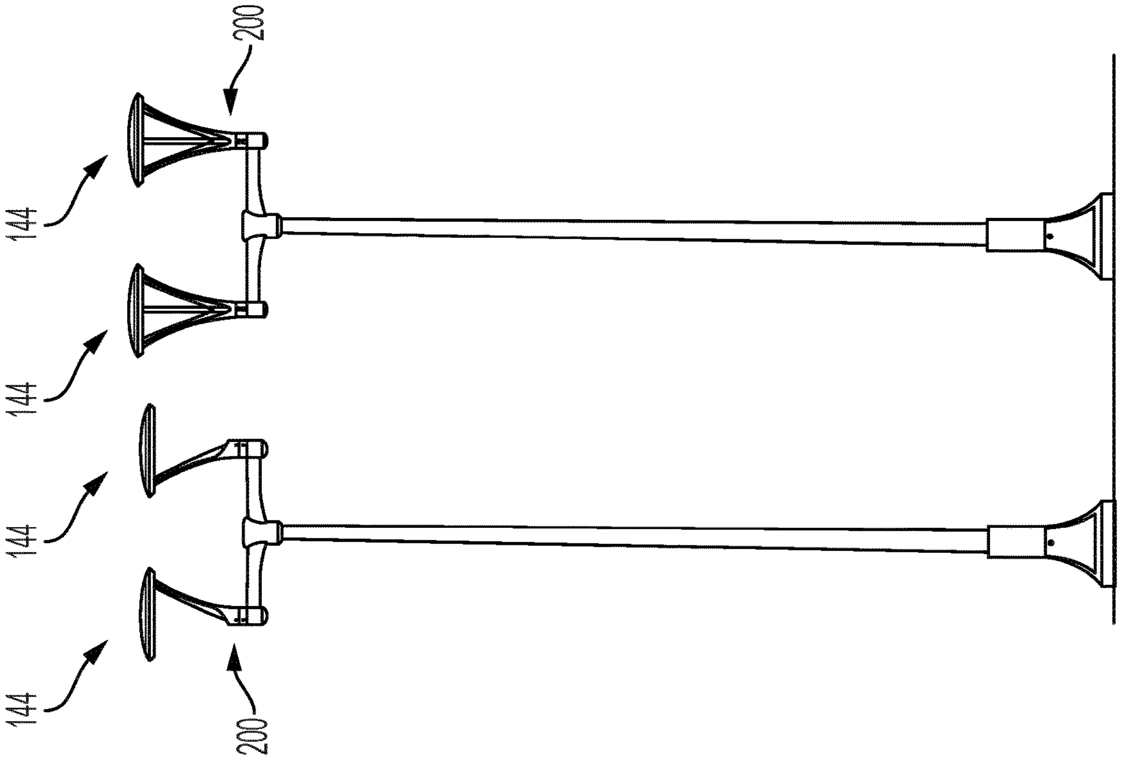
FIG. 1B is an illustration of two public infrastructure light fixtures, each having a pair of luminaires, in accordance with an example.

The present disclosure is directed generally to a collar assembly used to secure a slipfitter assembly to a light pole tenon. Each collar assembly includes two set screws, a perpendicular set screw and an angled set screw, to drive a collar towards a light pole tenon. Using multiple collar assemblies allows the slipfitter assembly to securely attach to a light pole tenon, even when the slipfitter assembly supports a top-heavy luminaire, and the light pole tenon is inserted into the slipfitter assembly at a low insertion depth.

The collar assembly includes a collar, a perpendicular set screw, and an angled set screw. The collar is arranged within the slipfitter housing. The slipfitter housing forms a pole cavity to receive the light pole tenon.

The collar is configured to be driven by the set screws into contact with the light pole tenon inserted into the pole cavity. The collar includes a curved bottom edge and a curved top edge to enable the collar to snugly fit against the curved surface of the light pole tenon. Further, if the pole cavity is vertically tapered, such as by 3 degrees, the curved top edge of the collar may be narrower than the curved bottom edge to correspond to the taper, causing the collar to have a wedge-like shape.

Further, the collar can be made of an exterior member folded over an interior member. The exterior member receives the perpendicular and angled set screws, while the interior member interfaces with the light pole tenon inserted into the pole cavity. In this way, the mechanical forces applied by the set screws are conveyed from the exterior member to the interior member, before being applied to the light pole tenon. This arrangement distributes the forces throughout the interior member, reducing the concentration of mechanical force about the contact points of the set screws, and creating a more even application of forces on the curved surface of the light pole tenon. Additionally, a gap may exist between the interior and exterior members, and the collar may be made of spring steel, allowing the interior and exterior members to pinch together upon the application of the mechanical forces, and relax when the mechanical forces are reduced.

The collar is driven against the light pole tenon by two set screws. A perpendicular set screw is threaded through the slipfitter housing to apply a perpendicular mechanical force to a lower portion of the collar. This perpendicular mechanical force is perpendicular to a longitudinal axis of the slipfitter housing and the pole cavity, and drives the lower portion of the collar towards the light pole tenon in a horizontal manner. The lower portion of the collar can have a lower dimple to receive the perpendicular set screw.

Further, an angled set screw is also threaded through the slipfitter housing. The angled set screw applies an angled mechanical force to an upper portion of the collar. This angled mechanical force is at an angle of less than or equal to 40 degrees relative to the longitudinal axis of the slipfitter housing and the pole cavity. The angled mechanical force drives the upper portion of the collar towards the light pole tenon at an angle. The angled mechanical force also drives the upper portion of the collar upwards towards the ceiling of the pole cavity. The upper portion of the collar can have an upper dimple to receive the angled set screw.

The two set screws allow for two degrees of freedom per collar assembly. Accordingly, in a slipfitter assembly with three collar assemblies, the slipfitter assembly will have six degrees of freedom to secure the light pole tenon. Six degrees of freedom provides improved retention and resistance to vibration.

Figure 1A:
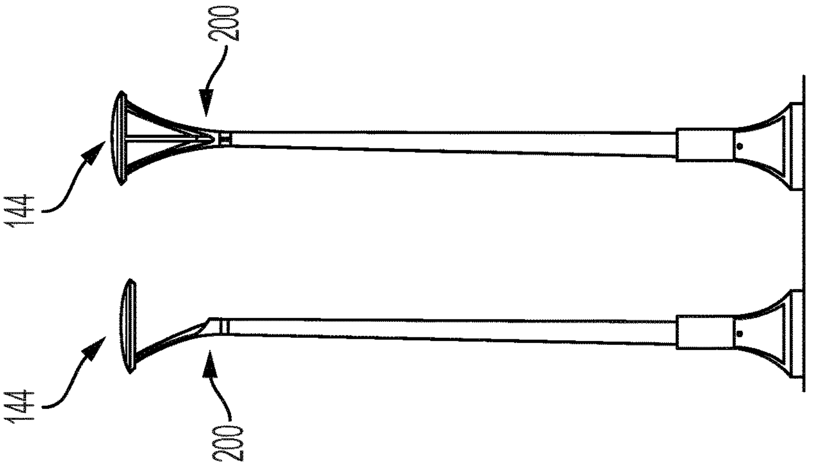
FIG. 1A is an illustration of two public infrastructure light fixtures, in accordance with an example.

FIG. 1A shows a pair of example of top-heavy light fixtures constructed for use in public infrastructure. For example, these luminaires may be used to illuminate public streets or sidewalks. Each of these luminaires includes a slipfitter assembly 200 securing a load 144, such as a luminaire, to a light pole. In some examples, the luminaires can be as heavy as 60 pounds. As will be described in more detail below, the slipfitter assembly 200 must be designed to withstand vibrations as high as 3 G without loosening of the load 144. FIG. 1B shows variations of the fixtures of FIG. 1A. where each fixture has a pair of slipfitter assemblies 200, each assembly 200 corresponding to a load 144.

Figure 2:
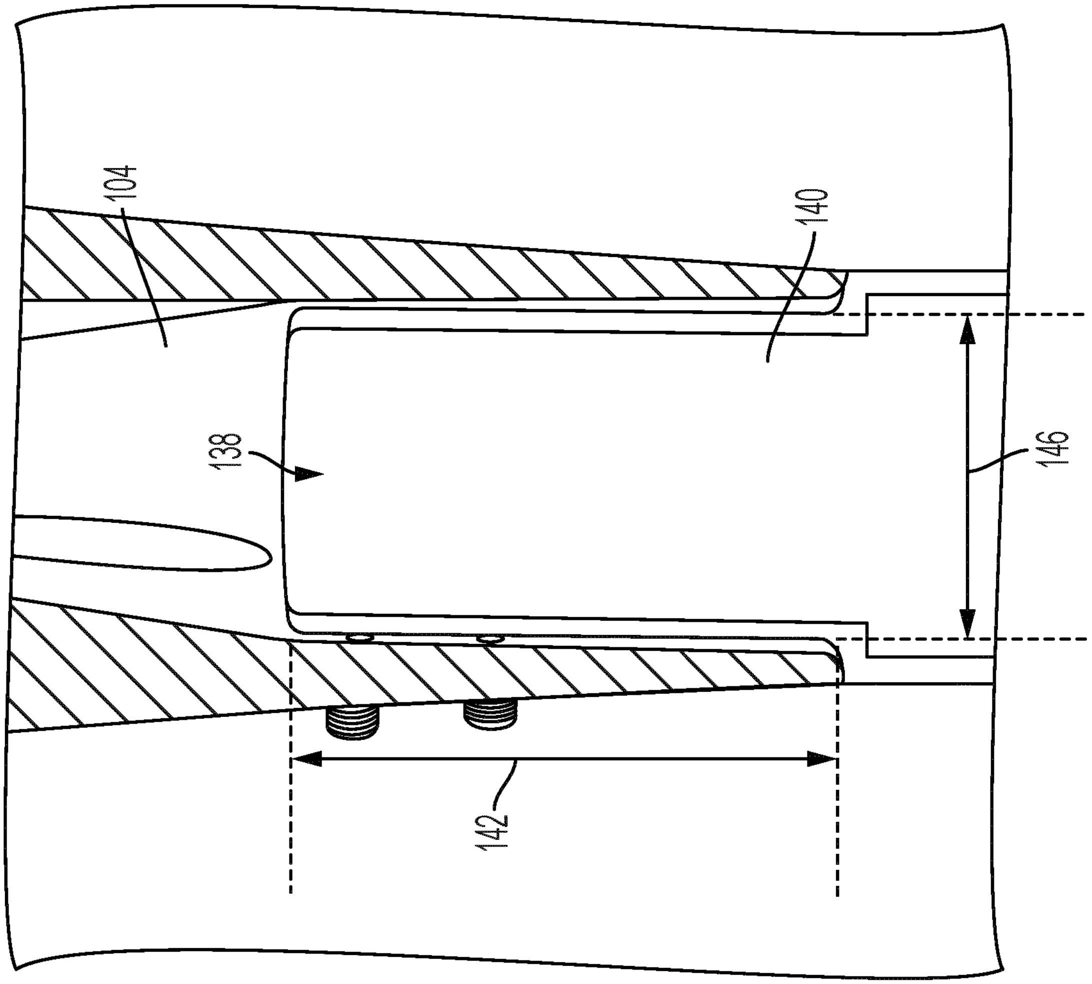
FIG. 2 is an illustration of a light pole tenon inserted into a slipfitter, in accordance with an example.

FIG. 2 shows an example slipfitter assembly 200 secured to a light pole tenon 140. As can be seen from FIG. 2, the light pole tenon 140 is a narrower extension of a light pole. In some examples, the light pole tenon 140 has a diameter 146 of approximately 3 inches. The light pole tenon 140 is inserted into a tapered pole cavity 138 defined by the slipfitter housing 104. The length of the light pole tenon 140 inserted into the tapered pole cavity 138 is dictated by the insertion depth 142 of the cavity 138. In some cases, the insertion depth 142 of the tapered pole cavity 138 can be as low as 3.5 to 4 inches. Shallow insertion depths 142 place greater strain on the set screws used by the slipfitter assembly 200 to secure and retain the light pole tenon 140. In some examples, the tapered pole cavity 138 has a taper of approximately 3 degrees.

Figure 3:
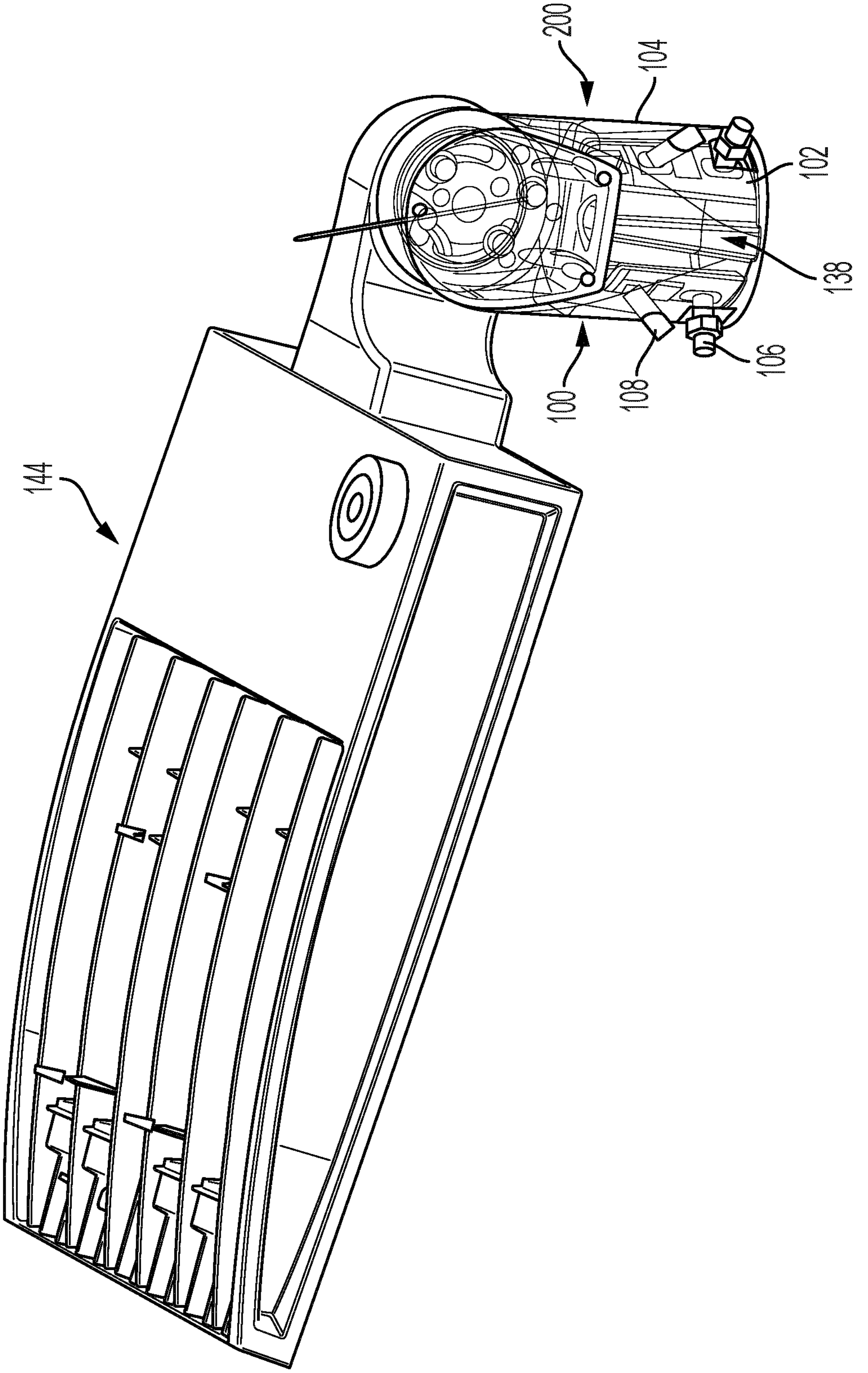
FIG. 3 is an isometric drawing of a slipfitter assembly supporting a luminaire, in accordance with an example.

FIG. 3 shows an example slipfitter assembly 200 supporting a load 144, wherein the load 144 is a luminaire. The slipfitter assembly 200 includes three collar assemblies 100, which are shown in greater detail in FIG. 4. Each of the collar assemblies 100 includes a collar 102, a perpendicular set screw 106, and an angled set screw 108. The perpendicular set screw 106 and the angled set screw 108 are threaded through the slipfitter housing 104. The perpendicular set screw 106 and the angled set screw 108 are tightened to secure the collar 102 against the light pole tenon 140 (not shown) inserted into the tapered pole cavity 138 formed by the slipfitter housing 104. Once tightened, each of the perpendicular set screws 106 may be secured by one or more lock nuts. The perpendicular set screws 106 and the angled set screws 108 are typically made of steel. The collars 102 are typically made of steel or aluminum, such as spring steel.

While three collar assemblies 100 may be optimal in many applications, additional collar assemblies 100 may be used depending on their implementation. The two set screws 106, 108 allow for two degrees of freedom per collar 102. Accordingly, the slipfitter assembly 200 shown in FIG. 3 will have six degrees of freedom to secure the light pole tenon 140. Six degrees of freedom provides improved retention and resistance to vibration.

Figure 4:
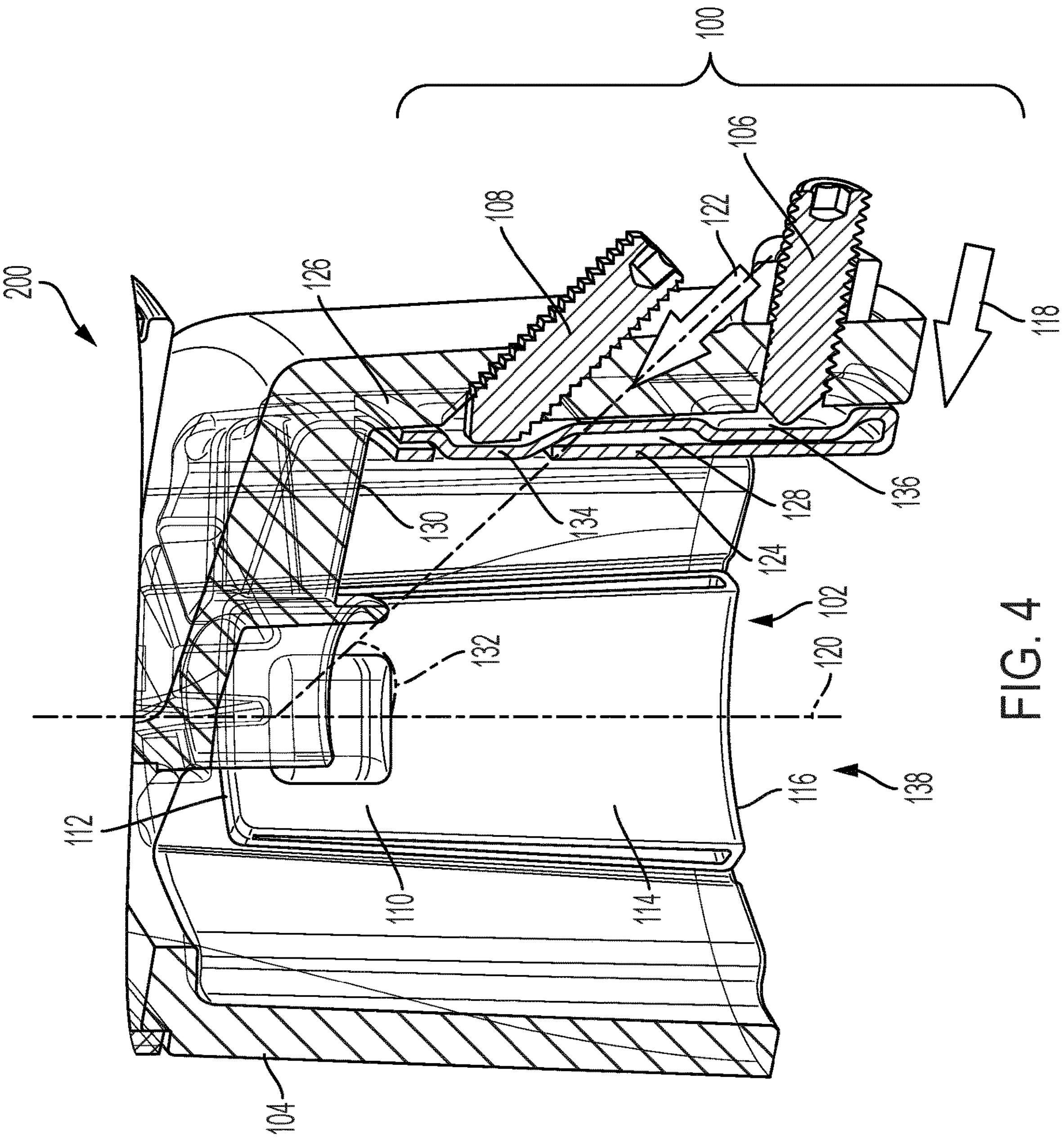
FIG. 4 is an isometric drawing of the interior of a slipfitter assembly, in accordance with an example.

FIG. 4 shows an example interior of a slipfitter assembly 200. As described above, the slipfitter assembly 200 includes a plurality of collar assemblies 100, and each collar assembly 100 includes a collar 102, a perpendicular set screw 106, and an angled set screw 108.

The collars 102 are configured to be driven by the set screws 106, 108 into the light pole tenon 140 (not shown) inserted into the tapered pole cavity 138 formed by the slipfitter housing 104. The collars 104 may be defined by an upper portion 110 having a top edge 112 and a lower portion 114 having a bottom edge 116. The top edge 112 and bottom edge 116 may be curved such that the collar 102 fits snugly against the curved surface of the light pole tenon 140. Further, in the example of FIG. 4, the top edge 112 of the collar 102 is narrower than the bottom edge 116 to correspond to the taper of the tapered pole cavity 138, causing the collar 102 to have a wedge-like shape.

As shown in the example of FIG. 4, the collars 102 includes an interior member 124 and an exterior member 126. The interior member 124 is folded over the exterior member 126, such that the exterior member 124 faces the slipfitter housing 104, while the interior member 126 faces the light pole tenon 140 inserted into the tapered pole cavity 138. The exterior member 126 receives set screws 106, 108, and transfers the forces 118, 122 from these set screws 106, 108 to interior member 124, which is driven against the light pole tenon 140. This arrangement distributes the forces throughout the interior member 124. This distribution both reduces the concentration of mechanical force about the contact points of the set screws 106, 108 and creates a more even application of force on the curved surface of the light pole tenon 140.

Further, folding the interior member 124 over the exterior member 126 can form one or more gaps 128 between the members 124, 126. If the collar 102 is made of flexible material, such as spring steel, the members 124, 126 may pinch together upon the application of forces 118, 122 from the set screws 106, 108, and then relax upon reduction of these forces 118, 122.

As previously described, the collar 102 is driven against the light pole tenon 140 by two set screws 106, 108. A perpendicular set screw 106 is threaded through the slipfitter housing 104 to apply a perpendicular mechanical force 118 to a lower portion 114 of the collar 102. As shown in FIG. 4, this perpendicular mechanical force 118 is perpendicular to a longitudinal axis 120 of both the slipfitter housing assembly 104 and the tapered pole cavity 138. The perpendicular mechanical force 118 drives the lower portion 114 of the collar 102 towards the light pole tenon 140 in a horizontal manner. As shown in FIG. 4, the lower portion 114 of the collar 102 can include a lower dimple 136 configured to receive the perpendicular set screw 106.

Further, an angled set screw 108 is also threaded through the slipfitter housing 104. This angled set screw 108 applies an angled mechanical force 122 to an upper portion 110 of the collar 102. In some examples, the angled mechanical force 122 is at an angle 132 less than or equal to 40 degrees relative to the longitudinal axis of the slipfitter assembly 104 and the tapered pole cavity 138. The angled mechanical force 122 drives the upper portion 110 of the collar 102 towards the light pole tenon 140 according to the angle 132. Further, the angled mechanical force 122 also drives the upper portion 110 of the collar 102 towards the ceiling 130 of the slipfitter assembly 104. As shown in FIG. 4, the upper portion 110 of the collar can include an upper dimple 134 configured to receive the angled set screw 108.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A slipfitter assembly, comprising:

a slipfitter housing forming a tapered pole cavity configured to receive a light pole tenon, wherein the tapered pole cavity is formed around a longitudinal axis of the slipfitter housing;

a plurality of collars arranged within the slipfitter housing, wherein each of the plurality of collars comprises an upper portion with a top edge) and a lower portion with a bottom edge;

a plurality of perpendicular set screws, wherein each of the plurality of perpendicular set screws is configured to apply a perpendicular mechanical force, relative to a longitudinal axis of the slipfitter housing, to a lower portion of one of the plurality of collars;

a plurality of angled set screws, wherein each of the angled set screws is configured to apply an angled mechanical force, relative to the longitudinal axis of the slipfitter housing, to an upper portion of one of the plurality of collars; and wherein the collar further comprises an interior member folded over an exterior member.

2. The slipfitter assembly of claim 1, wherein the top edge and bottom edge of each of the plurality of collars are concentric with the tapered pole cavity of the slipfitter housing.

3. The slipfitter assembly of claim 1, wherein the slipfitter assembly is configured to support a load of approximately 60 pounds.

4. The slipfitter assembly of claim 1, wherein the tapered pole cavity is configured to receive a light pole tenon with a diameter of approximately 3 inches.

5. The slipfitter assembly of claim 1, wherein the tapered pole cavity has an insertion depth of approximately 4 inches.

6. The slipfitter assembly of claim 1, wherein the bottom edge of the collar is longer than the top edge.

7. The slipfitter assembly of claim 1, wherein both the bottom edge and the top edge are curved.

8. The slipfitter assembly of claim 1, wherein the collar further comprises a gap between the interior member and the exterior member.

9. The slipfitter assembly of claim 1, wherein the angled mechanical force drives the collar towards a ceiling of the slipfitter housing.

10. The slipfitter assembly of claim 1, wherein the collar is spring steel.

11. The slipfitter assembly of claim 1, wherein the angled set screw forms an angle with the longitudinal axis of the slipfitter housing less than or equal to 40 degrees.

12. The slipfitter assembly of claim 1, wherein the upper portion of the collar comprises an upper dimple configured to receive the angled set screw.

13. The slipfitter assembly of claim 1, wherein the lower portion of the collar comprises a lower dimple configured to receive the perpendicular set screw.

* * * * *